(12) United States Patent
Chiba

(10) Patent No.: US 7,028,974 B1
(45) Date of Patent: Apr. 18, 2006

(54) LENS MOLDING DIE AND A PRODUCING METHOD THEREFOR

(75) Inventor: Toru Chiba, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 09/574,229

(22) Filed: May 19, 2000

(30) Foreign Application Priority Data

May 21, 1999 (JP) .................... HEI 11-141215

(51) Int. Cl.
*B29D 11/00* (2006.01)
(52) U.S. Cl. .............. 249/114.1; 249/134; 425/117; 425/808; 264/2.5
(58) Field of Classification Search ........... 249/114.1, 249/134; 425/808, 117; 264/2.5, 225
See application file for complete search history.

(56) References Cited

U.S. PATENT DOCUMENTS

| | | | | |
|---|---|---|---|---|
| 3,660,545 A | * | 5/1972 | Wichterle | 264/2.1 |
| 4,416,837 A | * | 11/1983 | Neefe | 264/2.1 |
| 4,517,140 A | * | 5/1985 | Rawlings | 264/2.1 |
| 5,141,678 A | * | 8/1992 | Blum | 264/1.7 |
| 5,204,126 A | * | 4/1993 | Singh et al. | 249/114.1 |
| 5,643,504 A | | 7/1997 | Chiba | |
| 5,759,457 A | * | 6/1998 | Inoue et al. | 264/2.5 |
| 6,052,232 A | | 4/2000 | Iwaki | |
| 6,315,929 B1 | * | 11/2001 | Ishihara et al. | 249/114.1 |

FOREIGN PATENT DOCUMENTS

JP 01-218808 * 9/1989

* cited by examiner

*Primary Examiner*—Donald Heckenberg
(74) *Attorney, Agent, or Firm*—Greenblum & Bernstein, P.L.C.

(57) ABSTRACT

A lens molding die for producing a lens, which comprises a base member made of a hard material and having one surface of a predetermined shape; and a resin-molded layer formed on the one surface of the base member and having a surface shape corresponding to a predetemined shape of a lens to be molded. The resin-molded surface is to be made of a resin material which is inactive with a material which is to be molded by the lens molding die. The resin-molded layer is formed by introducing the material into the space formed between the one surface of the base member and a transfer surface formed on a transfer die correspondingly to the surface of a lens to be produced to be cured by heat or ultraviolet rays.

11 Claims, 2 Drawing Sheets

LENS MOLDING DIE AND A PRODUCING METHOD THEREFOR

BACKGROUND OF THE INVENTION

The present invention relates to a lens molding die and a producing method therefor.

It has been known to produce a lens such as a plastic lens by injection-molding of a resin material. In this way of production, required are a pair of molding dies made of metal or glass and a spacer to be arranged between the dies to form a molding space therebetween. The one surface of respective lens molding die is formed to have a predetermined shape corresponding to that of the respective surface of a lens to be produced. A through-hole for injecting a resin material into the molding space is formed on a spacer.

In the lens fabricating process with the above explained items, a pair of lens molding dies are disposed with the lens forming surfaces thereof opposing to each other and securely contacted, by means of clamping or the like, with placing a spacer therebetween to form a closed space corresponding to the shape of a lens to be produced.

Then, lens material is injected into the closed space through the though-hole of the spacer, and energy is applied to the lens material in the closed space externally, by means of heat, ultra-violet rays or the like, to harden it. Thereafter, the hardened material, i.e., the produced lens is taken out of the molding dies by disassembling them. The molding dies and the spacer are re-used after washing, smoothening and so on.

In accordance with the above explained conventional method for producing a lens, a pair of lens molding dies are occupied for producing one lens until the lens material therein is hardened, so that a large number of molding die pairs must be prepared in order to carry out a mass-production with the above method. However, it costs much to produce a molding die of metal or glass having a molding surface of a precise shape.

Further, as it is necessary for re-using them to take the steps of washing, smoothening and so on, the molding surfaces of the dies are more or less mechanically damaged and/or destroyed while repeating these steps, which causes shortening the life time of the dies.

Accordingly, the cost for producing lenses increases due to the high cost and the short life time of the molding dies, resulting in high prices of the produced lenses.

In the meantime, aspherical lens have recently been widely employed and it has been desired to carry out mass-production for aspherical lenses which are of complex shapes. In order to produce aspherical lenses, the molding surface of a die must be processed to be of aspherical shape, which requires, however, expensive processing machine, high processing technique and long processing time. Thus, the lens molding dies therefor and the resulting lens products become particularly expensive.

SUMMARY OF THE INVENTION

It is therefore an object of the present invention to provide an improved lens molding die capable of being produced at relatively low cost and in relatively short time.

For the above purpose, in accordance with the present invention, there is provided a lens molding die which comprises:

a base member made of a hard material and having one surface of a predetermined shape; and a resin-molded surface layer formed on the one surface of the base member and having a surface shape corresponding to a predetermined shape of one surface of a lens to be produced.

In the embodiments, the predetermined shape of the one surface of the base member is spherical while the surface shape of the resin-molded surface layer is aspheric.

The resin-molded surface layer is to be made of a material which is inactive with a material to be molded by the lens molding die. The surface layer may be made of a thermo-setting resin material or a ultraviolet-curable resin material.

When producing a lens molding die, a base member is made of a hard material and provided with one surface of a predetermined shape, and a resin-made surface layer is formed on the one surface of the base member to have a surface shape corresponding to a predetermined shape of one surface of a lens to be produced.

The resin-made surface layer is to be formed by disposing a transfer die and a base member with facing the transfer surface of the transfer die to the one surface of the base member to form a predetermined space therebetween, introducing a resin-material into the predetermined space, and hardening the introduced resin-material.

In case of a ultraviolet-curable resin material, a base member is preferably made of a transparent material and the ultraviolet rays are projected to the layer through the base member. Alternatively, the transfer die may be mad of a transparent material and the ultraviolet rays are projected to the layer through the transfer die.

DESCRIPTION OF THE PREFERRED EMBODIMENTS

Figure 1:
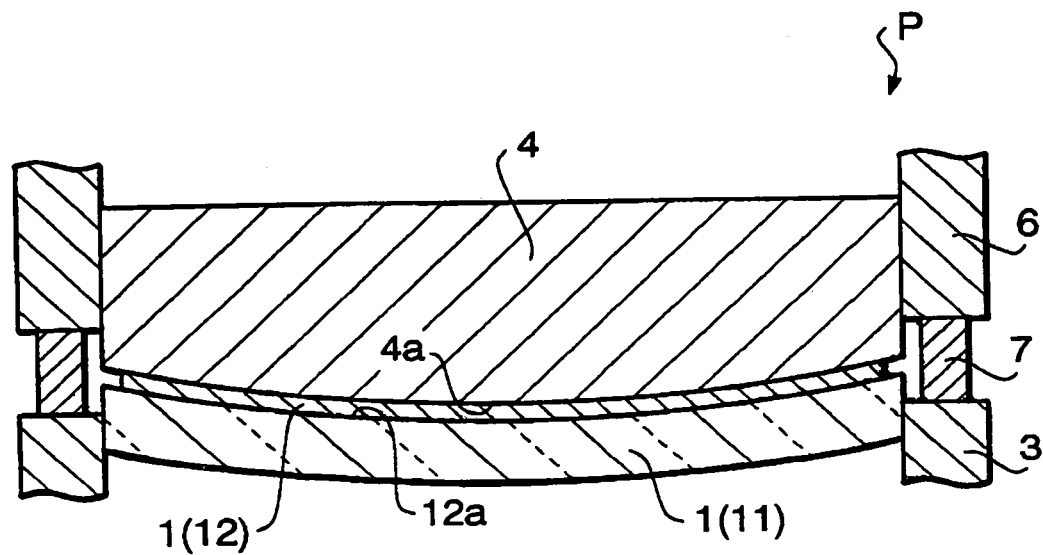
FIG. 1 is a sectional view showing a lens molding die and a device for producing it.

As shown in FIG. 1, a lens molding die 1 embodying the invention comprises a base member 11 of a substantially disc-plate shape having a spherical surface, and a molded layer 12. FIG. 1 also shows a device P for producing the die 1, which comprises an upper cylindrical holder 6 capable of securely holding the transfer die 4 therein, a transfer die 4 of a substantially columnar shape having a transfer surface 4a at one end surface thereof, a lower cylindrical holder 3 arranged to be opposed to the upper cylindrical holder 6 and capable of securely holding the base member 11 therein, and a positioning member 7 disposed between the opposing surfaces of the upper and lower holders 6 and 3.

The base member 11 of the lens molding die 1 is made of glass having the concave upper surface. The lower surface of the base member 11 is of a convex shape having the same curvature radius as that of the upper surface. The molded layer 12 of the lens molding die 1 is formed by hardening the resin material to form a lens molding surface 12a as later described.

The transfer die 4 of the producing device P is made of a hard metal material, and the transfer surface 4a thereof is protruded to be of an aspherical-shape. The diameter of the transfer die 4 is substantially same as that of the base member 11 of the lens molding die 1. The transfer surface 4a of the transfer die 4 is formed by machining operation and finished by polishing to have a predetermined shape which is to be transferred onto the lens molding surface 12a.

The upper and lower holders 6 and 3 are supported by a supporting structure, not shown, to be movable in the direction toward and away from each other. The base member 11 of the lens molding die 1 is fitted into the lower holder 3 through the upper end opening thereof, while the transfer die 4 is fitted into the upper holder 6 through the lower end opening thereof.

The positioning member 7 is of a ring shape, the inner diameter of which is larger than those of the holders 3 and 6 while the outer diameter thereof is smaller than those of the holders 3 and 6.

Hereinafter, a method for producing the lens molding die 1 by employing the producing device P will be explained.

First, the lower holder 3 is moved by operating a supporting mechanism, not shown, to the position where the lower holder 3 is positioned away from the upper holder 6. Under this state, the base member 11 is fitted into the lower holder 3 with the concave surface thereof facing up, while the transfer die 4 is fitted into the upper holder 3 with the transfer surface 4a facing down.

Next, the positioning member 7 is placed on the upper end surface of the lower holder 3 by operating a supporting structure, not shown, and further a predetermined amount of a molding material is dripped onto the central area of the concave surface of the base member 11.

Then, the lower holder 3 is moved upwardly to approach toward the upper holder 6 by a supporting structure, not shown, such that the positioning member 7 is sandwiched and securely held between the lower end surface of the upper holder 6 and the upper end surface of the lower holder 3. Thereafter, the molding material between the upper surface of the base member 1 and the lower surface of the transfer die 4 is heated by a heater, not shown, or subject to ultraviolet rays depending upon the physical properties of the material, to harden the molding material for forming the molded layer 12 on the upper surface of the base member 11.

Then, the molded layer 12 and the base member 11 are cooled down nearly to a room temperature in case of thermosetting material and the produced lens molding die 1 is taken out after moving the lower holder 3 to be away from the upper holder 6 and removing the positioning member 7.

Figure 2:
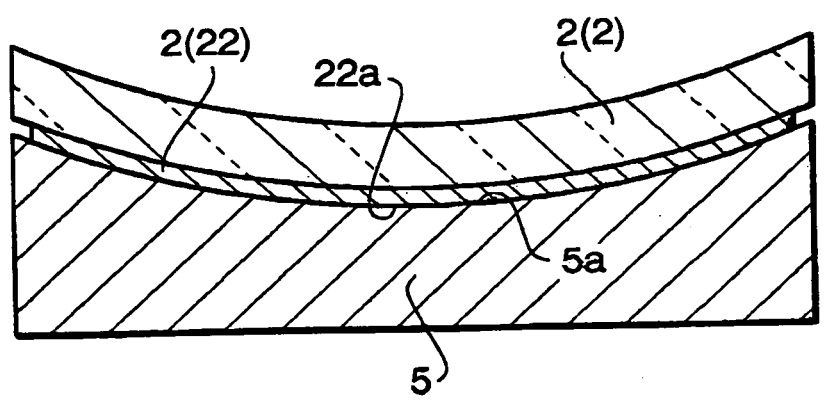
FIG. 2 is a sectional view explaining how to produce a lens molding die.

Thus obtained molding die 1 is to be used as one of a pair of opposing dies for producing a lens. Other one of the pair of opposing dies is to be produced as illustrated in FIG. 2. That is, although the concave molding surface is formed on the lens molding die 1, a lens molding die 2 is to be formed to have a convex molding surface.

Accordingly, as shown in FIG. 2, a base member 21 of the lens molding die 2 is provided with a convex surface while a transfer die 5 is provided with a concave surface 5a, and the lens molding die 2 is disposed, with the convex surface thereof facing down, above the transfer die 5 to form a molded layer 22 having a convex surface. The lens molding die 2 is produced in a similar manner as the lens molding die 1 by employing the producing device P explained above.

Figure 3:
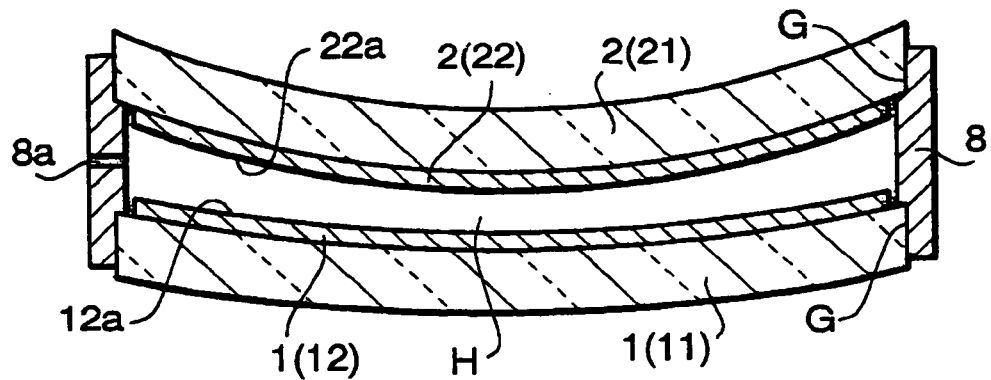
FIGS. 3 and 4 are sectional views explaining how to produce a lens with a pair of lens molding dies.
Figure 4:
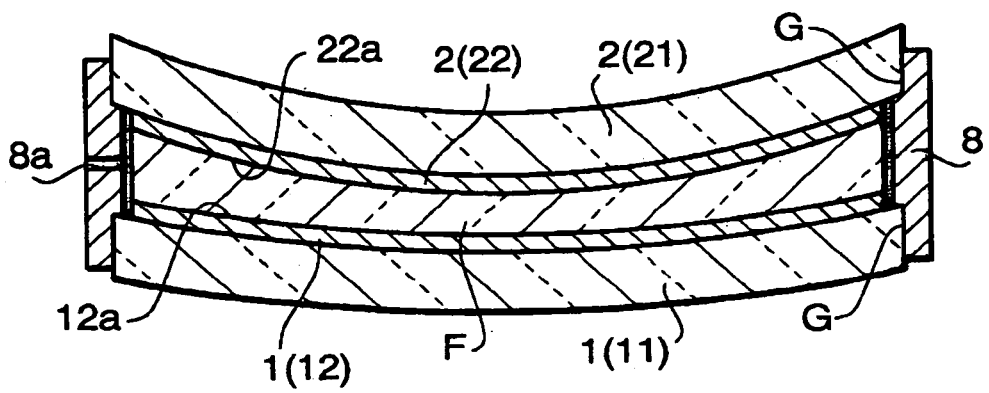
Figure 5:
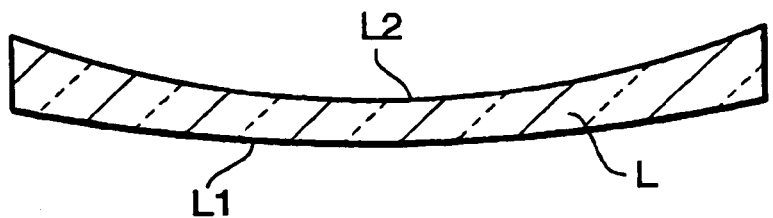
FIG. 5 is a sectional view showing a lens produced.

A pair of molding dies 1 and 2 thus produced are used for producing a lens L shown in FIG. 5 in such a way as illustrated in FIGS. 3 and 4.

First, as shown in FIG. 3, the lens molding dies 1 and 2 are disposed to be opposed to each other via a sealing spacer 8 which faces the concave surface of the former to the convex surface of the latter. The sealing spacer 8 is ring-shaped, the outer diameter of which is larger than the outer diameters of the molding dies 1 and 2 while the inner diameter is smaller. The upper and lower edge portions of the sealing spacer 8 are provided with the inner stepped portions G for receiving the edge portions of the molding dies 1 and 2. That is, the inner diameters of the upper and lower stepped portions of the sealing spacer 8 are same as the outer diameters of the molding dies 1 and 2. By forcing the molding dies 1 and 2 to be securely seated on the stepped portions G of the sealing spacer 8 by means of a tape or a clip, not shown, an air-tight closed space H is formed by the inner surfaces of the sealing spacer 8 and the molding dies 1 and 2. A through-hole 8a for allowing a lens material to be introduced into the closed space H by means of a hypodermic syringe is formed on the sealing spacer 8, not shown, or the like.

FIG. 4 shows the lens material F filled in the closed space H. The lens material F filled in the closed space H is then cured by being subject to heat generated by a heater, not shown, or subject to ultraviolet ray projected by a ultraviolet lamp, not shown, depending upon the physical properties of the lens material F.

In the meantime, the material for the molded layers 12 and 22 are to be selected from the materials which are inactive with the lens material F, so that the molded layers 12 and 22 can keep their shapes even during curing treatments without being reacted with the lens molding material F.

Upon elapse of a predetermined time after completion of curing treatment, the obtained lens L as shown in FIG. 5 is taken out of the producing device P. The obtained lens L is provided with the lens surfaces L1 and L2 of the predetermined shapes transferred from the lens molding surfaces 12a and 22a of the lens molding dies 1 and 2.

EXAMPLE 1

In this example, the base member made of glass and having the concave upper surface of the 180 mm curvature radius and the 65 mm length diameter is employed for one of a pair of lens molding dies, while the base member of 80 mm curvature radius and the 65 mm length diameter is employed for another lens molding die. As the material for forming the molded layer on the base member, the mixture of the resin material "1300T" and the curing agent "cat", both of which are the products of "Shinetsu Silicone (Japanese company)" is employed and heated for 3 hours at the temperature of 60° C. to have the cured layer of 0.5 mm thickness at the center thereof.

Then, the mixture of the following double-fluid-type epoxides is employed as the lens material F:

Principal agent (2/3): "EPICOAT 801P (Product of Yuka Shell Epoxy Co. Ltd)"

Curing Agent (1/3): "EPOMATE B002 (Product of Yuka Shell Epoxy Co. Ltd)"

The lens material F filled in the closed space H is heated by a heater, not shown, at the temperature of 100° C. for 4 hours to be thermo-set. Upon elapse of a predetermined time for cooling down nearly to a room temperature after completion of thermosetting treatment, the lens L having the lens surface of a target shape is obtained.

EXAMPLE 2

In this example, the material which is different from that employed in Example 1 is used for forming the molded layer on the base member. That is, the mixture of Urethane Oligomer (3/7 weight), Trimethylolepropane Triacrylate Modified Propyleneoxide (TMPA, 4/7 weight) made by Nippon Kayaku Co., Ltd, and "IRUGACURE 651 (polymerization initiator, 1%)" is employed, and cured by subjecting to the ultraviolet rays of 400W for 5 minutes to form the cured layer of 0.2 mm thickness at the center thereof. With employing the obtained lens molding dies, the lens L having the lens surface of a target shape is obtained as in Example 1.

EXAMPLE 3

In this example, instead of Trimethylolpropane Triacrylate Modified Propyleneoxide employed in Example 2, Trimethylolepropane Diacrylate Modified Neopenthylglycol made by Nippon Kayaku Co., Ltd. is employed. With this, the lens L having the lens surface of a target shape is obtained as in Example 2.

In accordance with the above embodiment, the base member of the lens molding die can be produced by relatively easy machining processing as the surface thereof is of a spherical shape, and further the final lens molding surface of the lens molding die can be easily produced even if it is for a complex lens surface such as an aspheric surface since the final lens molding surface can be obtained by molding a resin material to form the molded layer on the base member. Accordingly, even if the lens surfaces to be obtained are complex ones such as aspheric surfaces, once a pair of transfer dies having transfer surfaces of predetermined shapes corresponding to the lens surfaces to be obtained are made of a hard metal material or the like, a plurality of pairs of the lens molding dies can be easily produced in relatively short time and at relatively low cost.

Further, in case the lens molding surface of the lens molding die is damaged due to repeated use thereof, it can be easily repaired by re-forming the molded layer of the lens molding die with the transfer dies, resulting in extension of life of the lens molding die at fairly low cost.

Moreover, by employing a ultraviolet-curable material, the time required for producing the molded layer, and therefore the lens molding die can be shortened.

It should be noted that the present disclosure relates to subject matters contained in Japanese Patent Application No. Hei 11-141215 filed on May 21, 1999, which is expressly incorporated herein by reference in its entirety.

What is claimed is:

1. A lens molding assembly which comprises:
a lens molding die comprising:
a base member made of a hard material and having one surface of a predetermined shape;
a resin-molded surface layer formed on said one surface of the base member and having a surface shape corresponding to a predetermined shape of one surface of a lens to be produced; and
a lower cylindrical holder configured to surround and fixedly hold said base member;
an upper member having a lower surface configured to contact the surface of said resin-molded surface layer;
an upper cylindrical holder configured to surround and fixedly hold said upper member; and
a ring-shaped positioning member configured to be coaxially sandwiched between said lower and upper cylindrical holders, wherein:
said surface shape of said resin-molded surface layer is uninterrupted and conforms to said predetermined shape of said base member;
said resin-molded surface layer is inactive with a material to be molded by said lens molding die;
a curvature of said surface shape of said resin-molded surface layer is different from a curvature of said predetermined shape of said base member; and
a thickness of said resin-molded surface layer is less than a thickness of said base member.

2. The lens molding assembly according to claim 1, wherein the predetermined shape of said one surface of the base member is spherical while the surface shape of the resin-molded surface layer is aspheric.

3. The lens molding assembly according to claim 1, wherein said surface layer is made of a thermosetting resin material.

4. The lens molding assembly according to claim 1, wherein said surface layer is made of a ultraviolet-curable resin material.

5. A lens molding assembly comprising:
a lens molding die comprising:
a base member having a surface configuration;
a resin-molded surface layer on said surface of said base member and having a surface layer surface configuration corresponding to a shape of a surface of a lens to be produced; and
a lower cylindrical holder configured to surround and fixedly hold said base member;
an upper member having a lower surface configured to contact the surface of said resin-molded surface layer;
an upper cylindrical holder configured to surround and fixedly hold said upper member; and
a ring-shaped positioning member configured to be coaxially sandwiched between said lower and upper cylindrical holders, wherein:
said surface layer surface configuration is uninterrupted and conforms to said base member surface configuration;
a curvature of said surface layer surface configuration does not correspond to a curvature of said base member surface configuration; and
a thickness of said resin-molded surface layer is less than a thickness of said base member.

6. A lens molding die assembly comprising:
a lens molding die comprising:
a base member having a spherical surface;
a resin-molded surface layer on said spherical surface and having an aspherical surface configuration corresponding to a shape of a surface of a lens to be produced; and
a lower cylindrical holder configured to surround and securely hold said base member;
an upper member having a lower surface configured to contact the surface of said resin-molded surface layer;
an upper cylindrical holder configured to surround and fixedly hold said upper member; and
a ring-shaped positioning member configured to be coaxially sandwiched between said lower and upper cylindrical holders, wherein:
said aspherical surface of said resin-molded surface layer is uninterrupted and conforms to said spherical surface of said base member;
a thickness of said resin-molded surface layer is configured to vary only in accordance with the aspheric component of said resin-molded surface layer; and
a thickness of said resin-molded surface layer is less than a thickness of said base member.

7. The lens molding assembly according to claim 2, wherein a thickness of said resin-molded surface layer is configured to vary only in accordance with the aspheric component of said resin-molded surface layer.

8. The lens molding assembly according to claim 5, wherein:
   said surface layer surface configuration of said resin-molded surface layer is aspheric;
   said base member surface configuration is spherical; and
   a thickness of said resin-molded surface layer is configured to vary only in accordance with the aspheric component of the resin-molded surface layer.

9. The lens molding assembly according to claim 1, wherein a thickness of said resin-molded surface layer ranges from 0.2 mm to 0.5 mm.

10. The lens molding die assembly according to claim 5, wherein a thickness of said resin-molded surface layer ranges from 0.2 mm to 0.5 mm.

11. The lens molding die assembly according to claim 6, wherein a thickness of said resin-molded surface layer ranges from 0.2 mm to 0.5 mm.

* * * * *